No. 798,920. PATENTED SEPT. 5, 1905.
E. VON PORTHEIM.
METHOD OF REDUCING OXALIC ACID AND ITS DERIVATIVES
BY ELECTROLYSIS.
APPLICATION FILED JAN. 29, 1904.
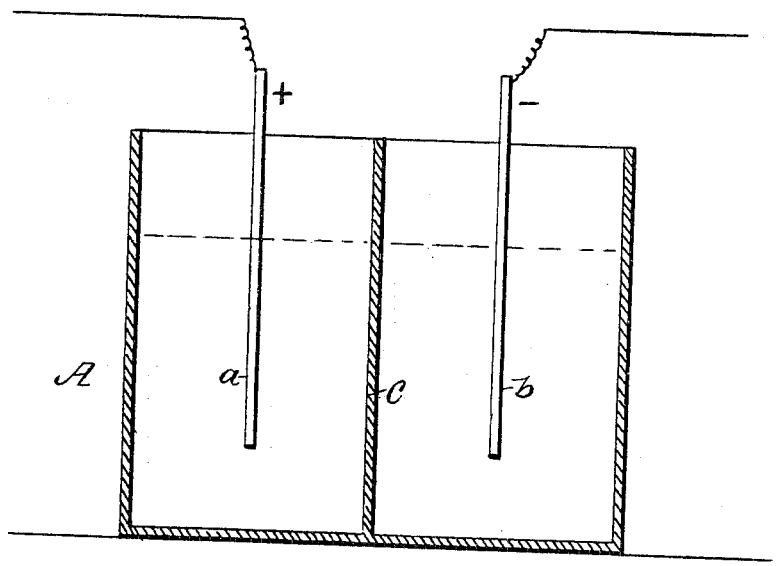
Witnesses.
Robert Everitt,
G. D. Kesler
Inventor
Emil von Portheim.
By James L. Norris
Atty.

UNITED STATES PATENT OFFICE.

EMIL VON PORTHEIM, OF PRAGUE, AUSTRIA-HUNGARY.

METHOD OF REDUCING OXALIC ACID AND ITS DERIVATIVES BY ELECTROLYSIS.

No. 798,920.     Specification of Letters Patent.     Patented Sept. 5, 1905.

Application filed January 29, 1904. Serial No. 191,192.

*To all whom it may concern:*

Be it known that I, EMIL VON PORTHEIM, a subject of the Emperor of Austria-Hungary, residing at Prague, Bohemia, Austria-Hungary, have invented certain new and useful Improvements in Methods for Reducing Oxalic Acid and its Derivatives by Electrolysis, of which the following is a specification.

Oxalic acid has hitherto been reduced by the electrolytic process to glycolic acid. This is all that has been known so far about this matter. I have found that by moderating the process of reduction glyoxalic acid is directly obtained, for the preparation of which acid no practical method has been hitherto known. Furthermore, I have reduced the esters and the amids of the oxalic acid with very satisfactory results, respectively, to esters and amids of the glyoxalic acid, said reduction being unknown till now. On the other hand, I have reduced by the same method the oxanilic acid and its derivatives to phenylglycin, ($C_8H_9NO_2$.) The rational formula is $C_6H_5.-NH.-CH_2.-CO_2H$ (or phenylglycocin) and its derivatives. Invariably in all of the foregoing processes when treating the mono and di substitutional derivatives of the oxalic acid one carboxyl group only is reduced, while the other is preserved.

The drawing accompanying this specification illustrates in sectional elevation one form of an apparatus by which the method can be carried out, and in the drawing A denotes a receptacle containing two electrodes $a$ $b$, respectively, and said receptacle is divided by a diaphragm $c$.

In carrying out the said process I employ electrodes made of lead or of mercury, &c., said electrodes being separated by a diaphragm or by other suitable means, and for the bath diluted sulfuric acid is employed. The materials to be reduced are dissolved in the diluted sulfuric acid in the cathode-compartment and are then electrolyzed in employing a current possessing the intensity of about three amperes to one square decimeter at 15° centigrade. However, the degree of concentration of the sulfuric acid, the temperature, and the density of the current have to be altered according to requirements in each particular case.

*First example.*—At the cathode oxalic acid is dissolved in diluted sulfuric acid of two and one-half per cent. concentration. The electrolysis is then started, and by titration with a solution of phenylhydrazine the increment of glyoxalic acid is ascertained. When the maximum is reached or just overpassed, the electrolysis is interrupted. The solution of glyoxalic acid is freed from the remaining small quantities of sulfuric acid by barium hydrate and retains no impurities, with the exception of a slight trace of glycolic acid.

*Second example.*—The dimethylester of oxalic acid is dissolved in the cathode liquid and electrolyzed. The methyl ester of glyoxalic acid is obtained in a very satisfactory yield. This ester has been identified by the reaction of transforming it into its phenylhydrazon, the description of which has been given by Harries, (*see Berichte der deutschen Chemischen Gessellschaft*, 36, 1936.)

*Third example.*—Oxalylanthranilic acid is dissolved in sulfuric acid of about eighty per cent. concentration and reduced by electrolysis. The formation of phenylglycin (o) carboxylic acid can be quantitatively ascertained by nitrite. The yield is a very satisfactory one. Finally, the sulfate of the phenylglycin carboxylic acid is freed from the excess of sulfuric acid by crystallization.

It may be mentioned that according to the lapsed German patent to Kopp & Co., No. 64,909, dated January 19, 1892, oxanilic acid, its esters, and amids are said to be reduced to glycins by treating them with zinc alone or with zinc and acids or sodium amalgam. In fact, only traces of glycins are obtained by employing this method, so that my method is the very first to obtain glycins out of oxalic acid.

I claim—

A method of obtaining glyoxalic acid, its esters and amids from compounds containing the radical oxalyl ($C_2O_2$) consisting in dissolving the compound to be treated in dilute sulfuric acid in the cathode-compartment of an electrolytic apparatus, and then electrolyzing said solution at a low or moderate temperature.

In testimony whereof I have hereunto set my hand in presence of two subscribing witnesses.

EMIL VON PORTHEIM.

Witnesses:
ADOLPH FISCHER,
ARTHUR SCHWEZ.